United States Patent
Rector et al.

(10) Patent No.: US 9,830,146 B2
(45) Date of Patent: Nov. 28, 2017

(54) API LIFECYCLE PLATFORM AND VERSION MANAGEMENT

(71) Applicant: Microsoft Technology Licensing, LLC, Redmond, WA (US)

(72) Inventors: Brent Rector, Redmond, WA (US); Lawrence Osterman, Woodinville, WA (US); William Messmer, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/912,444

(22) Filed: Jun. 7, 2013

(65) Prior Publication Data

US 2014/0366011 A1 Dec. 11, 2014

(51) Int. Cl.
G06F 9/44 (2006.01)

(52) U.S. Cl.
CPC ..................... *G06F 8/71* (2013.01)

(58) Field of Classification Search
CPC .......................................................... G06F 9/44
USPC ................................................. 717/169–172
See application file for complete search history.

(56) References Cited

U.S. PATENT DOCUMENTS

| | | | | |
|---|---|---|---|---|
| 5,910,180 A | * | 6/1999 | Flory et al. | 719/321 |
| 7,219,339 B1 | * | 5/2007 | Goyal | H04L 41/085 717/141 |
| 7,546,602 B2 | * | 6/2009 | Hejlsberg | G06F 9/54 717/114 |
| 7,941,402 B2 | * | 5/2011 | Smits | 707/638 |
| 8,037,025 B2 | * | 10/2011 | Fang | H04L 67/02 707/638 |
| 8,595,714 B1 | * | 11/2013 | Hamer | 717/170 |
| 9,110,770 B1 | * | 8/2015 | Raju | G06F 8/77 |
| 2002/0161596 A1 | * | 10/2002 | Johnson et al. | 705/1 |
| 2003/0191864 A1 | | 10/2003 | Govindarajapuram et al. | |
| 2004/0049481 A1 | * | 3/2004 | Blevins | 707/1 |
| 2004/0107416 A1 | * | 6/2004 | Buban et al. | 717/170 |
| 2005/0182828 A1 | * | 8/2005 | Lamkin et al. | 709/219 |
| 2006/0161910 A1 | * | 7/2006 | Bonsteel et al. | 717/170 |
| 2006/0215199 A1 | * | 9/2006 | Morita | G06F 3/1207 358/1.13 |
| 2006/0230395 A1 | * | 10/2006 | Paul | G06F 8/65 717/173 |
| 2006/0287890 A1 | * | 12/2006 | Stead et al. | 705/3 |

(Continued)

OTHER PUBLICATIONS

Stets ("Component-based Operating System APIs: A Versioning and Distributed Resource Solution"), Jul. 1999.*

(Continued)

*Primary Examiner* — Jae Jeon
(74) *Attorney, Agent, or Firm* — Arent Fox LLP

(57) ABSTRACT

Systems and methods for managing the lifecycle of an API over a number of different versions of an operating system—as well as over a number of different platforms are disclosed. In one embodiment, a method is disclosed wherein for a given API, metadata is created and associated with certain constructs of the API. The metadata may comprise a version indication. A set of versioning rules may be defined. Such versioning rules govern whether a particular construct of an API may be changed for a given version. These versioning rules may be enforced at the time of constructing a new build. The versioning rules may be enforced by the IDE system.

14 Claims, 5 Drawing Sheets

(56) References Cited

U.S. PATENT DOCUMENTS

| | | | |
|---|---|---|---|
| 2008/0066048 A1 | 3/2008 | Hafermann et al. | |
| 2008/0082974 A1* | 4/2008 | Ellison | G06F 8/71 |
| | | | 717/170 |
| 2008/0134156 A1 | 6/2008 | Osminer et al. | |
| 2009/0187610 A1* | 7/2009 | Guo | G06F 17/3028 |
| 2010/0299663 A1 | 11/2010 | Weissman et al. | |
| 2010/0318968 A1* | 12/2010 | Traut et al. | 717/122 |
| 2011/0078674 A1* | 3/2011 | Ershov | G06F 8/75 |
| | | | 717/170 |
| 2011/0153559 A1 | 6/2011 | Rangarajan et al. | |
| 2012/0222025 A1 | 8/2012 | Pandit | |
| 2013/0055211 A1 | 2/2013 | Fosback et al. | |
| 2013/0055291 A1 | 2/2013 | Pierson et al. | |
| 2013/0338972 A1* | 12/2013 | Chao et al. | 703/1 |
| 2014/0181262 A1* | 6/2014 | Goswami et al. | 709/219 |

OTHER PUBLICATIONS

Henkel, et al., "CatchUp! Capturing and Replaying Refactorings to Support API Evolution", In Proceedings of the 27th International Conference on Software Engineering, May 15, 2005, 10 pages.

\* cited by examiner

API LIFECYCLE PLATFORM AND VERSION MANAGEMENT

BACKGROUND

Over time and over the span of multiple versions of an operating system, the Application Programming Interface (API) of the operating system changes. New APIs are added; existing APIs are deprecated and eventually removed. It becomes more difficult for a software developer to understand which APIs are available to an application when building an application for a specific version of the operating system. The developer would like to know whether a particular API is in, say, version N of the operating system.

Additionally, this issue is compounded when the operating system exists on multiple hardware platforms. A particular API, A, may have been introduced to platform X in operating system version R. But a different hardware platform Y might not introduce that same API (A) until version S.

Finally, the lifecycle of an API includes potentially deprecating and removing an API from an operating system. Even though an API may have been introduced first in platform X, and subsequently in platform Y, deprecation might occur in either platform first. Actual removal of the API may also occur in any platform in any order. Much depends on the relative release cycles of the platform and the relative importance of the API on each platform.

For merely one example, consider the case in which a developer may want to create a reusable library of functionality. This library should work on platform X releases R−1 through R+3. The developer may want it to work as well on platform Y releases S−2 though S+1. The developer should know what APIs are available to the library code. Currently, a developer typically reads the documentation and determines the intersection of platforms and versions for each API used in the library.

Attempts have been made to ease this developer burden. For C/C++ applications, an API vendor may insert conditional #ifdef's in the language header files. These #ifdef's would include the declaration of an API only if the proper C/C++ preprocessor symbol had been previously defined. A developer could, in effect, define a symbol to say, "I'm targeting version 5 of the operating system" and the C/C++ preprocessor would omit all API declarations that were not defined to be present in version 5 of that operating system. However, this approach gets unwieldy as the matrix of potential versions and platforms increases.

Additionally, this solution only supports developers using the C/C++ programming language. Developer using other languages do not reference and use C/C++ header files.

And finally, it may be challenging for an integrated development environment (IDE) to provide programming assistance as to which APIs are available using C/C++ header files. In effect, the IDE must reproduce the preprocessor's behavior to determine what API declarations are in scope. Additionally, the IDE should reproduce the C/C++ compiler parser's behavior to examine the source code from the header file to identify the APIs that the preprocessor included. This tends to place a burden on any IDE, especially so when the IDE is not C/C++ focused.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

Systems and methods for managing the lifecycle of an API over a number of different versions of an operating system—as well as over a number of different platforms are disclosed. In one embodiment, a method is disclosed wherein for a given API, metadata is created and associated with certain constructs of the API. The metadata may comprise a version indication. The version indication may comprise a version value and a platform value. The version value may denote the version of the operating system in which the associated construct was revised. In addition, the platform value may denote the operating system platform associated with the version value. A set of versioning rules may be defined. Such versioning rules govern whether a particular construct of an API may be changed for a given version. These versioning rules may be enforced at the time of constructing a new build. In another embodiment, an integrated development environment system for aiding a programmer with the construction of a new version or new platform build may consume the metadata. The versioning rules may be enforced by the IDE system.

In one embodiment, a method for performing version control for an API introduced into an operating system, said operating system capable of being revised by version and by platform is disclosed. The method comprising: for a given API, creating metadata associated with a set of constructs of said API, said metadata comprising a version indication; associating a version indication for each said construct of said API, said version indication indicating when said construct is introduced into a given version of an operating system; defining a set of versioning rules for said constructs; when a new version of said operating system is constructed, enforcing said versioning rules to said constructs, according to said metadata associated with said constructs.

In another embodiment, an integrated development environment (IDE) system is disclosed. The IDE system may comprise a processor and a set of programming tools for users to program on said processor a set of constructs for an API, said API intended for a given version of an operating system and for a given platform, said IDE system comprising: a build tool, said build tool capable of receiving metadata associated with a set of constructs for an API; said metadata comprising a version indication; said build tool capable of receiving a set of versioning rules for said constructs; wherein said build tool further capable of enforcing said versioning rules to said constructs, according to said metadata associated with said constructs.

Other features and aspects of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Figure 1:
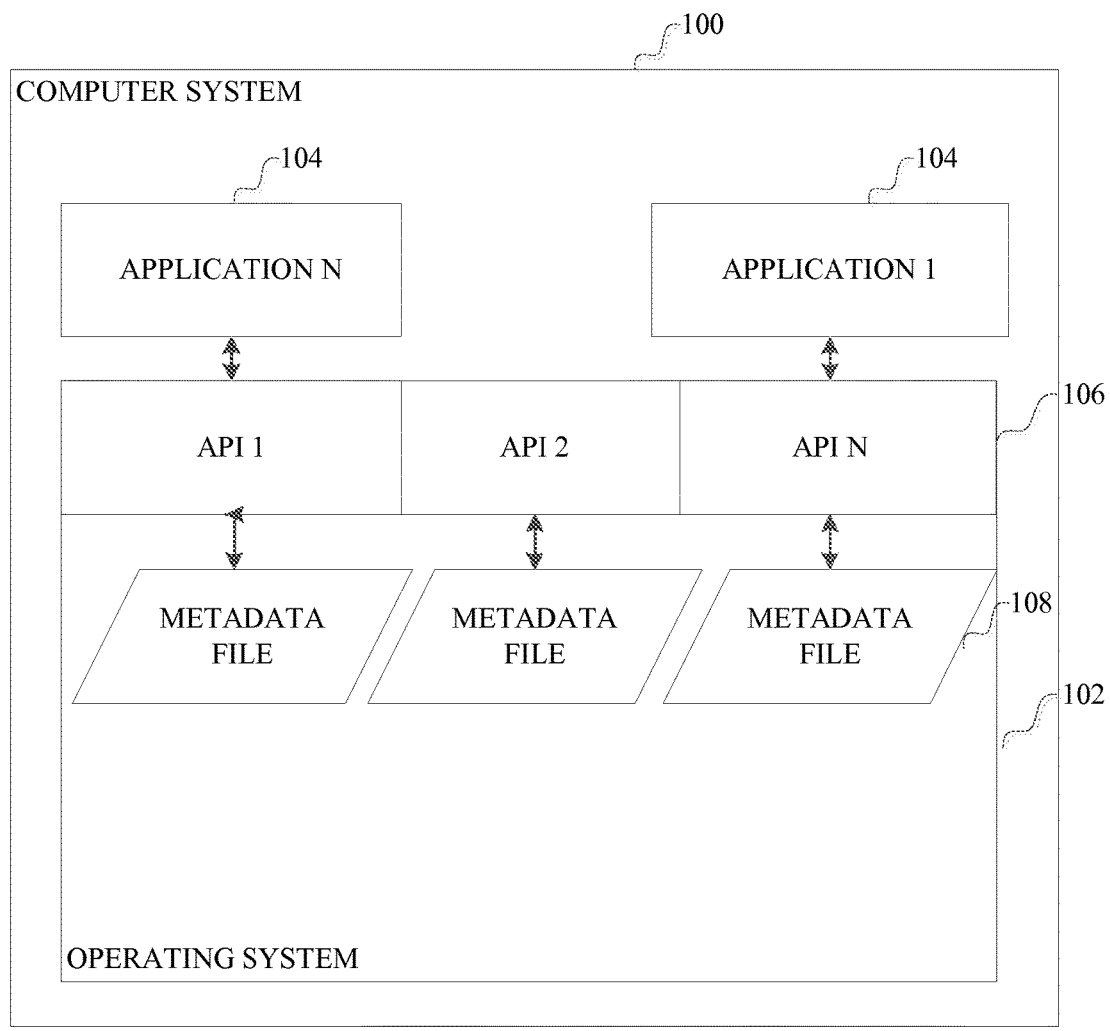
FIG. 1 is a block diagram of an example operating system with metadata describing application programming interfaces.

As utilized herein, terms "component," "system," "interface," "controller" and the like are intended to refer to a computer-related entity, either hardware, software (e.g., in execution), and/or firmware. For example, any of these terms can be a process running on a processor, a processor, an object, an executable, a program, and/or a computer. By way of illustration, both an application running on a server and the server can be a component and/or controller. One or more components/controllers can reside within a process and a component/controller can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Introduction

Referring to FIG. 1, a computer system 100 includes an operating system 102 that, in combination with computer hardware (see FIG. 4), provides a platform on which various applications 104 are run. Applications are run as processes managed by the operating system, and they consume or otherwise have access to resources of the computer system that are managed by the operating system, such as files, etc.

The operating system provides several application programming interfaces 106 that are accessed by the applications 104. These API's 106 are described by one or more metadata files 108. The metadata files 108 are a machine readable, programming language independent representation of the API or APIs of the operating system. As described below, such metadata files can be created automatically from API description files, thus allowing the automatic generation of a machine readable, programming language independent description of the surface, or full APIs, of the operating system. Such metadata files, combined with language compilers and/or interpreters (not shown) allow the applications 104 to be developed in a manner in which the operating system APIs are projected into the programming languages in a natural and automatic way.

Given this context, an example implementation of such an operating system will be described in more detail in connection with FIGS. 2 and 3.

Figure 2:
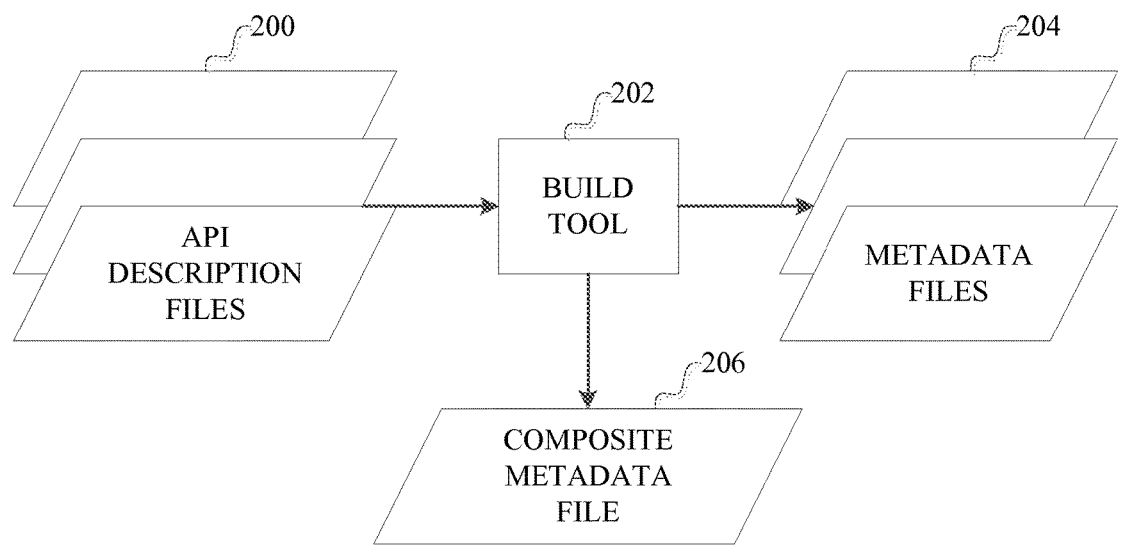
FIG. 2 is a data flow diagram illustrating an example implementation of development tools for building the operating system with metadata describing application programming interfaces.

In FIG. 2, an example data flow for application development is shown. Application programming interface description files 200 are defined by developers during the development process, i.e., the process of writing code that implements the operating system.

A build tool 202, used to compile the code for the operating system into executables to be installed on a computer system, processes the API description files to generate the metadata files 204. Finally, the build tool 202 combines the metadata files 204 into a combined metadata file 206.

Any implementation of a build tool 202 is dependent on the programming language and any specification for the API description files 200. Such API description files 200 can define interfaces that are functions or object classes or data structures, and can define one or more methods, events, properties, parameters, data types, parameter ordering, exceptions and the like for such interfaces. The build tool parses such API description files, identifies the characteristics of the interface, and stores data representing such characteristics in a machine readable, programming language independent format, in metadata files.

Figure 3:
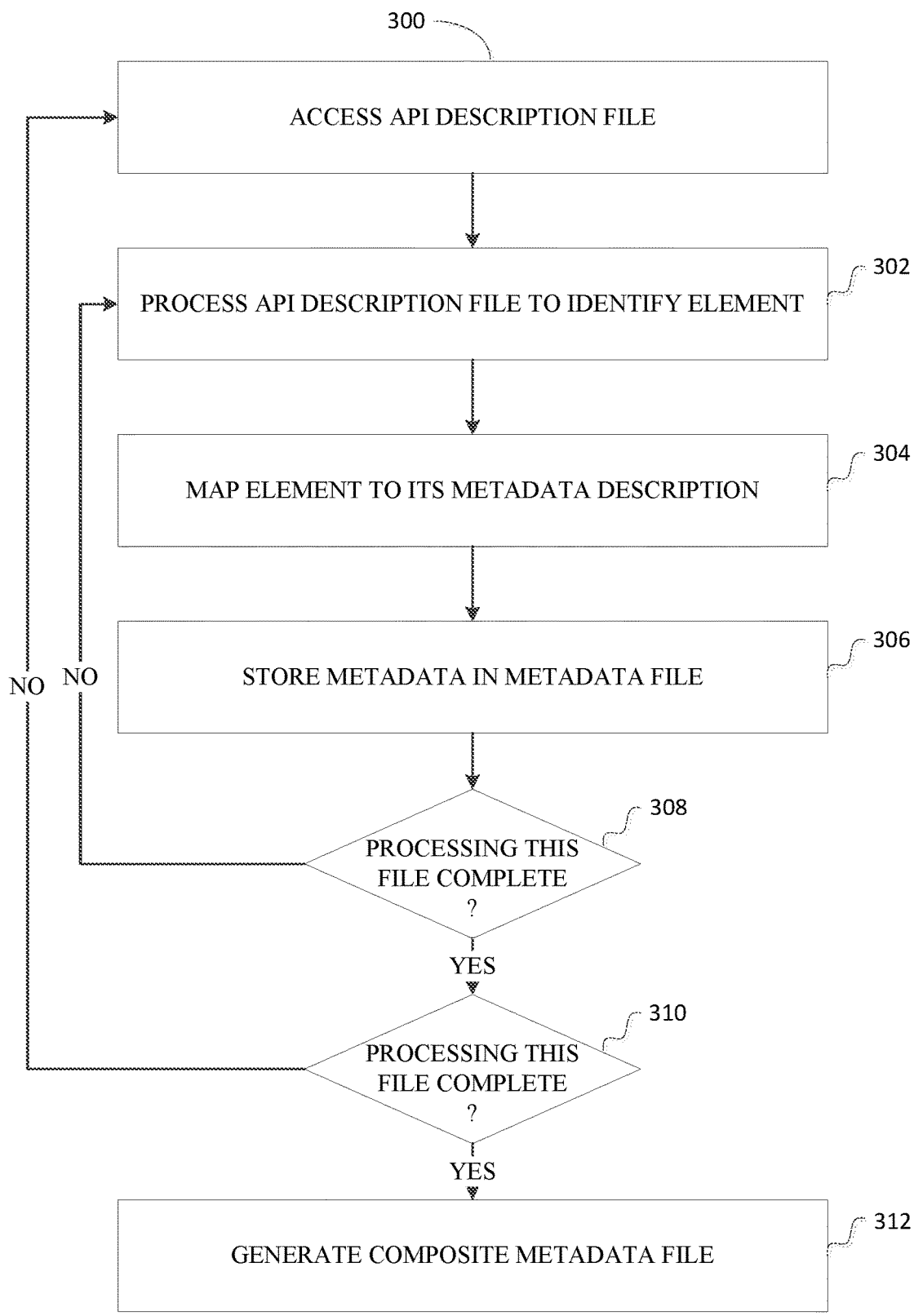
FIG. 3 is a flow chart illustrating an example of how API description files can be processed to generate metadata.

FIG. 3 illustrates a general example process performed by a build tool. The build tool accesses 300 an API description file. It processes 302 the API description file, identifying named elements of the API, such as classes, method, data types, properties, events, exceptions and the like. The identified named element is mapped 304 to its metadata representation. This metadata representation is stored 306 in a metadata file corresponding to the API description file. Until the API description file is completely processed, as determined in 308, steps 302 through 308 are repeated. After processing the API description file, another API description file (if any, as determined at 310), is accessed 300, and steps 302 through 308 are repeated for that file. When processing of all API description files has completed, then a composite metadata file is created 312. For example, the combined system metadata can be stored in a series of metadata files in the ECMA-335 CLI format, but the specific format is immaterial to the present application. This combined metadata file thus provides a complete, automatic, programming language independent description of the surface, i.e., the available interfaces, of the operating system.

Example mappings that can be used in step 304 will now be described. It should be understood that other mappings are possible, in terms of both form and structure of the metadata used to represent a named element in an API. In this example implementation, mapping an API description file to metadata involves first identifying named elements in the API description file. A named element can be or include any of a variety of data types, such as basic types, enumerated types, structures, delegates, interfaces, classes, methods, properties and events. The metadata file can include, for each named element of an application programming interface, an identifier (or type name) which is located in a name space.

In this implementation, every named element can be or can include any of a variety of data types, and has an identifier located within a namespace. Two named elements can have the same identifier so long as they exist in separate namespaces. When an API file that specifies the API uses a named element, such as in a parameter or struct field, the author of the file can use the fully namespace-qualified name or the short identifier. If the short identifier is used, a fully namespace-qualified name is used in the metadata by appending the short identifier onto the currently namespace scope. Using this mechanism, there is no way that a name can be ambiguous in the metadata. Namespace blocks can be used in the metadata, and these blocks can be nested, to avoid explicitly declaring the namespace on every named element within the block. A named element can be tagged with attributes. Example attributes include, but are not limited to, a version number, a simple flag, or they can contain additional information in parameters.

Turning now to example representation details, named elements that are fundamental types can be represented by an keyword consistent with that fundamental type, such as a Boolean, byte, double, float, int, long, short, character, string, guid, handle, error status, etc., followed by the identifier used in the API description file. For example, a Boolean representing a value called "answer" would be represented as: "Boolean Answer"

An example representation of an array is the following. It has a general form of a keyword, such as "array," followed by an identifier. This is followed by the pair of values being a pointer, and a number of elements in the array. For example:

TABLE-US-00001

[version([version number])] array [identifier] { [pointer] [number of elements] }

An example representation of an enumerated type ("Enum") is the following. First, it has a general form with the keyword "enum" that identifies an enumerated type, followed by an identifier. The identifier is followed by a collection of enum values. Like all types, enum identifiers are unique within the namespace they are contained in. However, enum value identifiers can be unique only within the enum itself.

TABLE-US-00002

[version([version number])] enum [identifier] { [value 1 identifier] [optional: = value], . . . [value n identifier] [optional: = value] } As an example, using rankings of playing cards: [version(OS.version.number)]enum CardRank { Ace = 1, Two, Three, Four, Five, Six, Seven, Eight, Nine, Ten, Jack, Queen, King }

An example representation of a simple data structure type ("struct") is the following. First, it has the general form with a structure type specifier, followed by a collection of fields, each of which has a type and an identifier. Like all types, struct identifiers are unique within the namespace they are contained in. However, struct field identifiers can be unique only within the struct itself.

TABLE-US-00003

[version([version number])] struct [struct.identifier] { [field[1] type] [field[1] identifier]; [field[n] type] [field[n] identifier]; }; As a specific example of a struct for arguments for a mouse event: [version(OS.version.number)] struct MouseEventArgs { MouseButtons Buttons; unsigned int Clicks; unsigned int Delta; Point Location; }

An example representation of an interface is a collection of methods, properties or events. The implementation of the methods can be done in a class that implements the interface. In addition to the common attributes, interfaces use a UUID attribute to be specified. An interface can "require" another interface. This signifies that if a component implements a given interface, all "required" interfaces also are implemented by the same component. An example grammar for representing an interface is as follows:

TABLE-US-00004

[version([version number])] interface: | attributes "interface" IDENTIFIER ':' IDENTIFER requires '{'interface_member_list'}' requires: | <empty> | "requires" interface_list interface_list: | IDENTIFIER |

TABLE-US-00004-continued

IDENTIFIER "," interface_list interface_member_list: | <empty> | interface_member | interface_member interface_member_list interface_member: | method | property | event In this example implementation, at the end of the representation of an interface are methods, properties and/or events. In this example, interfaces can contain methods which take zero or more parameters and return a single type. The return type of a method is HRESULT. Parameters have a name and a type. Parameters are marked with either the [in] or [out] attribute. There can be any number of input and output parameters. Parameters can be marked as both input and output for all RIDL-supported pointer types. A single output parameter can optionally be marked with [retval] for languages that map HRESULT return values to exceptions. Method names within an interface are unique.

Also in this example implementation properties can appears similar to fields, but are associated with the input and output parameters of the put and get operations used to access them.

Interfaces support events, a mechanism for the interface to notify interested parties when something of interest happens. The representation includes a specification of an add method and a specification of a remove method. The add method has a first parameter that is an input parameter of the event delegate type and a second parameter that is an output parameter of type EventRegistrationToken. The remove method has a first parameter that is an input parameter of type EventRegistrationToken. The event delegate type itself for an event has a first parameter that is an interface pointer to the event source, i.e. an object that sends this event. The following is an example that shows how the delegate type MouseEventHandler can be used to declare interface events.

TABLE-US-00005

[version([version number])] [eventadd] HRESULT MouseMove( [in] MouseEventHandler *pMouse, [out] EventRegistrationToken* token); [eventremove] HRESULT MouseMove( [in] EventRegistrationToken token).

Delegates can be represented as an interface with a single method Invoke whose signature matches the signature of the delegate specification. The method has a single return type and zero or more parameters. The return type of a delegate is HRESULT. Parameters have a name and a type. Parameters are marked as either input or output. There can be any number of input and output parameters. A single output parameter can optionally be marked as the return value for languages that map HRESULT return values to exceptions. An example grammar for representing a delegate is the following:

delegate: |delegate_attributes "delegate" TYPE_IDENTIFIER IDENTIFIER
'('parameter_list')';'

It should be understood that the foregoing are merely examples of how elements of an API can be represented in programming language independent metadata. A variety of metadata representations can be used.

By having an operating system for which the APIs are fully described by programming language independent metadata, it is possible to build a language projection, which is an application that reads the metadata and implements the API in another programming language. For example, a JavaScript interpreter can include such a language projection and automatically provide access by JavaScript programs to the operating system APIs. Programs in compiled languages can be provided similar access by a compiler that includes such a language projection.

Having now described an example implementation, an example computing environment in which such a system is designed to operate will now be described. The following description is intended to provide a brief, general description of a suitable computing environment in which this system can be implemented. The system can be implemented with numerous general purpose or special purpose computing hardware configurations. Examples of well-known computing devices that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 4:
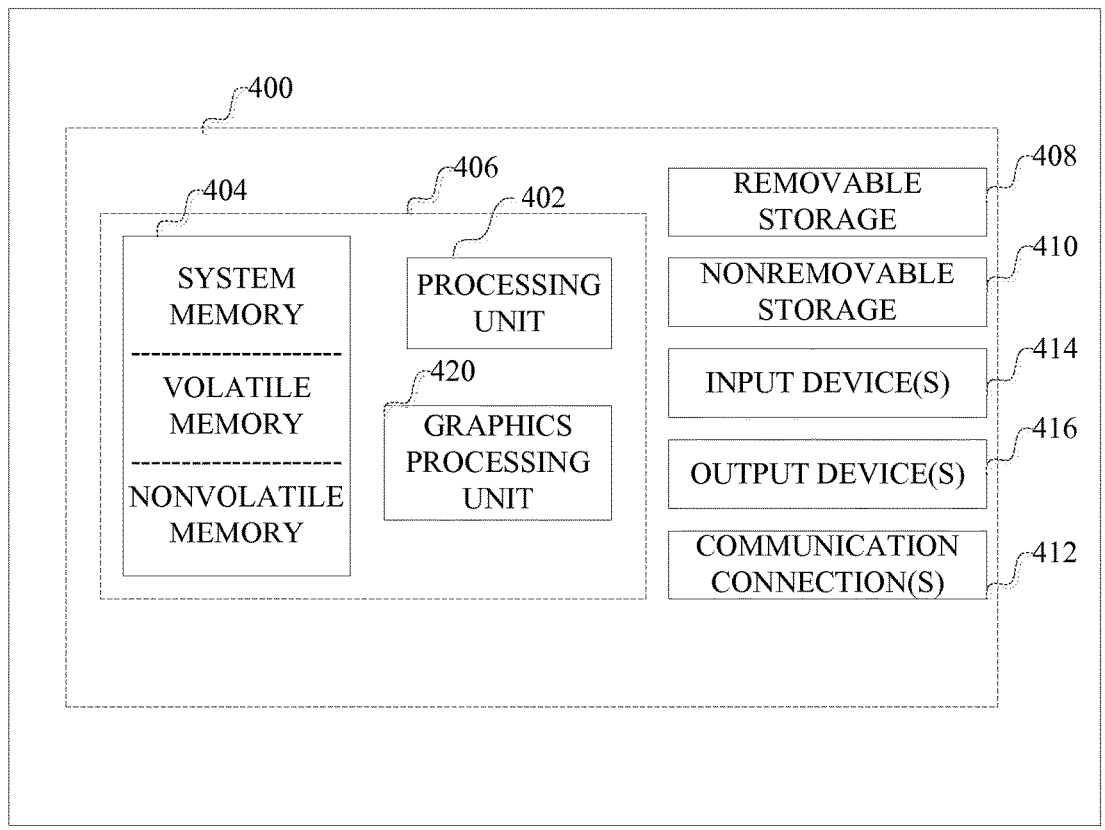
FIG. 4 is a block diagram of an example computing device in which such a system can be implemented.

FIG. 4 illustrates an example of a suitable computing system environment. The computing system environment is only one example of a suitable computing environment and is not intended to suggest any limitation as to the scope of use or functionality of such a computing environment. Neither should the computing environment be interpreted as having any dependency or requirement relating to any one or combination of components illustrated in the example operating environment.

With reference to FIG. 4, an example computing environment includes a computing machine, such as computing machine 400. In its most basic configuration, computing machine 400 typically includes at least one processing unit 402 and memory 404. The computing device may include multiple processing units and/or additional co-processing units such as graphics processing unit 420. Depending on the exact configuration and type of computing device, memory 404 may be volatile (such as RAM), non-volatile (such as ROM, flash memory, etc.) or some combination of the two. This most basic configuration is illustrated in FIG. 4 by dashed line 406. Additionally, computing machine 400 may also have additional features/functionality. For example, computing machine 400 may also include additional strage (removable and/or non-removable) including, but not limited to, magnetic or optical disks or tape. Such additional storage is illustrated in FIG. 4 by removable storage 408 and non-removable storage 410. Computer storage media includes volatile and nonvolatile, removable and non-removable media implemented in any method or technology for storage of information such as computer program instructions, data structures, program modules or other data. Memory 404, removable storage 408 and non-removable storage 410 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing machine 400. Any such computer storage media may be part of computing machine 400.

Computing machine 400 may also contain communications connection(s) 412 that allow the device to communicate with other devices. Communications connection(s) 412 is an example of communication media. Communication media typically carries computer program instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media.

Computing machine 400 may have various input device (s) 414 such as a display, a keyboard, mouse, pen, camera, touch input device, and so on. Output device(s) 416 such as speakers, a printer, and so on may also be included. All of these devices are well known in the art and need not be discussed at length here.

Such an operating system with metadata describing application programming interfaces can be implemented in the general context of software, including computer-executable instructions and/or computer-interpreted instructions, such as program modules, being processed by a computing machine. Generally, program modules include routines, programs, objects, components, data structures, and so on, that, when processed by a processing unit, instruct the processing unit to perform particular tasks or implement particular abstract data types. This system may be practiced in distributed computing environments where tasks are performed by remote processing devices that are linked through a communications network. In a distributed computing environment, program modules may be located in both local and remote computer storage media including memory storage devices.

One Embodiment

In one embodiment, the present system may allow the implementer of an API to specify the platform and version in which the API was introduced, removed and/or deprecated. In some embodiments, the present system may allow the implementation of an API to specify multiple platform/version pairs to indicate all of the platforms, plus their respective versions, in which the API was introduced, removed and/or deprecated. In some embodiments, the present system may allow the creation of a metadata description of all APIs present on a union of all platforms and all versions.

In addition, the present system may allow the creation of a filtered view of the APIs present on a particular platform and version. Given the metadata description of all APIs present on a union of all platforms and all versions, tooling may produce additional filtered metadata files that describe the APIs present on a subset of the union. For example, tooling may produce metadata files that contain only the APIs for Windows version 8.

In some embodiments, the present system may allow for the introduction of a version attribute and a "deprecatable" attribute that API authors may apply to each and every construct in their API that may change from version to version and/or from platform to platform. The version attribute indicates the platform and version of that platform in which the API construct to which the attribute is applied was introduced. The deprecatable attribute indicates the platform and version of that platform in which the API construct to which the attribute is applied was deprecated and/or removed.

Various API constructs may be changed in subsequent versions only in controlled ways if the API construct change is not to break existing clients of the API. It may be possible to optionally apply these version attributes in ways that preserve compatibility of the API from version to version while also allowing it to change in non-breaking ways. The following describes the one manner for using the version attribute to avoid such breaking changes. The attribute may be applied more generally and without the constraints described in the following if a developer were not concerned with breaking existing client code.

In many embodiments, the metadata for API version attributes, deprecatable attributes, constructs, and/or platform attributes may be stored and/or associated at many points in a present system. For example, such metadata and/or descriptions for APIs and constructs may be stored in metadata file 108 in FIG. 1 or in API description files 200, metadata files 204 and/or composite metadata files 206. Platform metadata and/or attributes may be stored in API description files 200, metadata files 204 and/or composite metadata files 206. It will be appreciated, however, that metadata, constructs, attributes or the like may be stored in any suitable part of the present system.

Structure Versioning

The following discussion included herein may tend to be drawn to examples involving Windows® operating systems, and versions thereof. However, it should be appreciated that the present systems, methods and/or techniques are applicable to all known operating systems and their version. The use of Windows operating system examples are merely for expository purposes and the scope of the present application should not be limited by such.

A structure is "immutable" after it is published, as changing a structure declaration tends to break existing compiled code built prior to the declaration change. As a result, it may not be possible to apply the version attribute to a field of a structure. For merely one example, consider constructing two different structs—e.g., Rect and RectD—whereas Rect struct is defined for Windows® Version 8 operating system (and generalized as "OSn"), and RectS struct is defined for Windows® Version 9 operating system (and generalized as "OSn+1") as below:

```
[version(NTDDI_OSn)]
typedef struct Rect
{
    float X;
    float Y;
    float Width;
    float Height;
} Rect;
```

The new structure, RectD, may be defined in later versions of the operating system as follows:

```
[version(NTDDI_OSn+1)]
typedef struct RectD
{
    double X;
    double Y;
    double Width;
    double Height;
} RectD;
```

The above is an example of the existing version attribute functionality. In order to maintain compatibility with existing source files, a suitable Interface Description Language (IDL) (e.g., WinRT IDL) should interpret such uses of the version attribute, which do not provide a platform specification, to mean that the Windows Platform is implied. However, the IDL should permit the version attribute to have an additional Platform specification to allow the specification that the structure was introduced in version N of platform Y.

In one embodiment, it is possible to define an OS Runtime Platform enumeration with a value for each appropriate platform. Additionally, it may be possible to define a version attribute that accepts two values: one required and one optional. The required parameter (e.g., version introduction value) is the version in which the API construct was introduced. The optional parameter (e.g. platform value) indicates the platform to which that version applies. In the following examples, the default is to the platform with value zero when a platform is not specified. In some embodiments, the version indication may comprise a version value and a platform value. The version value may denote the version of the operating system in which the associated construct was revised. In addition, the platform value may denote the operating system platform associated with the version value.

A developer can then add the appropriate version attribute to a type to specific the version of the platform in which the type was introduced.

For one embodiment, it may be possible to allow any numeric value for the required parameter. It is possible to define an enumerated type, OS.Foundation.Metadata.Platform, as the value accepted for the optional parameter.

```
[version(NTDDI_OS8)]
[version (PHONE_NAME, Platform.Phone)]
[version (CONSOLE_NAME, Platform.CONSOLE)]
enum OS.Foundation.Metadata.Platform {
                                                OS = 0,
    [version (PHONE_NAME, Platform.Phone)]      Phone = 1,
    [version (CONSOLE_NAME,                     Console = 2,
    Platform.CONSOLE)]
};
```

In the following example below, the Rect struct is attributed to indicate that it is present on three platforms: (1) Version NTDDI_OSn of the OS platform; (2) Version PHONE_NAME of the Phone platform and (3) Version CONSOLE_NAME of the Console platform (where Console may be a suitable game console, e.g., Microsoft Xbox® console).

However, the RectD struct is attributed to indicate that it is present on two platforms: (1) Version NTDDI_OSn+1 of the OS platform; and (2) Version PHONE_NAME of the Phone platform. However, it is not present on the Console platform.

```
[version(NTDDI_OSn)]
[version(PHONE_NAME, Platform.Phone)]
[version (CONSOLE_NAME, Platform.Console)]
typedef struct Rect
{
    float X;
    float Y;
    float Width;
    float Height;
} Rect;
[version(NTDDI_OSn+1)]
[version(PHONE_NAME), Platform.Phone]
typedef struct RectD
{
    double X;
```

```
        double Y;
        double Width;
        double Height;
} RectD;
```

Enum Versioning

An enum may be additively mutable after it is published. This means that a developer may be able to add new enum values in subsequent releases. However, existing values may not be removed or modified from an enum declaration without potentially causing a breaking change to existing applications. An enum value, without a version attribute, inherits the version attribute applied to the type itself. In one embodiment, a new version of the type may add a new value by adding the value and the appropriate version attribute. It may be considered invalid and should be flagged as an error if the platform target of a value is not one of the targets of the enum itself.

For one example, it may be possible to have:

```
[version(NTDDI_OSn), flags]
enum ErrorOptions
{
    None = 0,
    SuppressExceptions = 0x01,
    ForceExceptions = 0x02,
    UseSetErrorInfo = 0x04,
    SuppressSetErrorInfo = 0x08,
};
```

As mentioned, an enum value, without a version attribute, inherits the version attribute applied to the type itself.

In the prior example, all values were introduced in the OSn declaration of the enum type. By adding an additional Platform.Phone version to the enumerated type declaration, all values without an explicit version attribute may be redefined to be available on the Phone platform as of the specified version as well as on the Windows platform as of version NTDDI_OSn.

```
[version(NTDDI_OSn), version(PHONE_NAME, Platform.Phone),
flags]
enum ErrorOptions
{
    ...
};
```

A future release of the type can add a new value by adding the value and the appropriate version attribute:

```
[version(NTDDI_OSn)]
[version(PHONE_NAME, Platform.Phone)]
[flags]
enum ErrorOptions
{
    None = 0,
    SuppressExceptions = 0x01,
    ForceExceptions = 0x02,
    UseSetErrorInfo = 0x04,
    SuppressSetErrorInfo = 0x08,
    [version(NTDDI_WIN9)] FormatAllHardDrives = 0x10,
    [version(PHONE_APOLLO, Platform.Phone)] ErasePhone = 0x20,
};
```

It may be considered invalid and should be flagged as an error if the platform target of a value is not one of the targets of the enum itself.

Interface Versioning

An interface is immutable after it is published, as changing an interface declaration tends to break any existing compiled code built prior to the declaration change. As such, an interface and all of its members (properties, methods and events) is an atomic entity from the versioning perspective.

In one embodiment of the present system, the following property may be desirable—to wit, unlike enumerated types, which may have additional values defined in subsequent releases, an interface should never change: no properties, methods, or events can be added or removed without potentially causing a breaking change to existing client code.

However, new versions of the operating system may introduce newly defined interfaces. As a result, it may be possible to have the ability to tag an interface with a version number. This may be performed via the version attribute as follows:

```
[version(NTDDI_OSn),
version(PHONE, Platform.Phone),
uuid(...),
exclusiveto(DesignMode)]
interface IDesignModeStatics : IInspectable
{
    [propget] HRESULT DesignModeEnabled([out, retval]
    boolean *value);
}
[version(NTDDI_OSn+1),
uuid(...),
exclusiveto(DesignMode)]
interface IDesignModeStatics2 : IInspectable
{
    [propget] HRESULT EnhancedModeEnabled([out, retval]
    boolean
*value);
}
```

A parser may perform some sanity checks of version attribute use on an interface. When the interface is parameterized on a type that is not defined on the same platform, the parser may report an error because all type references should be verified against platforms to ensure that all types are resolvable. For example, in the following interface IB is defined to be present only on the Phone platform. However, its method MyMethod requires a parameter of type interface IA, which is not defined to be present on the Phone platform. A parser may produce an error diagnostic for such declarations.

```
[version(NTDDI_OSn)
    interface IA { ... }
    [version(PHONE, Platform.Phone)]
    interface IB {
        HRESULT MyMethod(IA* source);
    }
```

RuntimeClass Versioning

A runtime class is mutable after it is published, as changing a runtime class declaration simply identifies what interfaces the runtime class implements. To avoid breaking existing client code, subsequent versions of a runtime class may augment the set of interfaces that the runtime class implements; but, in one embodiment, they may never remove an implemented interface. In such an embodiment, such a rule might imply, with regard to Platform versioning, that a runtime class on one platform may implement a different set of interfaces than the same runtime class on a different platform. This and other versioning rules comprise a set of rules that enforces permitted changes to a construct.

Runtime class versioning may comprise a number of vectors and/or rules in which new functionality can be introduced into a runtime class. A runtime class may introduce new instance interfaces, a new default constructor interface, new non-default constructor interfaces, new static interfaces and new composable interfaces.

The following is merely one example of a runtime class declaration of a class that may have been introduced in one version, but gained new functionality in a later version:

```
[version(NTDDI_OSn),
  static(IDesignModeStatics, NTDDI_OSn),
  activatable(NTDDI_OSn),
  activatable(IDesignModeFactory, NTDDI_OSn),
  static(IDesignModeStatics2, NTDDI_OSn+1),
  activatable(IDesignModeFactory2, NTDDI_OSn+1)]
runtimeclass DesignMode
{
    [default]              interface IDesignMode;
    [version(NTDDI_OSn+1)]  interface IDesignMode2;
}
```

It is possible then to update the class declaration to state that the Phone NAME platform took the OSn+1 version of the class except the additional OSn+1 static methods:

```
[version(NTDDI_OSn),
  static(IDesignModeStatics, NTDDI_OSn),
  activatable(NTDDI_OSn),
  activatable(IDesignModeFactory, NTDDI_OSn),
  static(IDesignModeStatics2, NTDDI_OSn+1),
  activatable(IDesignModeFactory2, NTDDI_OSn+1)]
[version(PHONE_NAME, Platform.Phone),
  static(IDesignModeStatics, PHONE_NAME, Platform.Phone),
  activatable(PHONE_NAME, Platform.Phone),
  activatable(IDesignModeFactory, PHONE_NAME, Platform.Phone),
  static(IDesignModeStatics2, NTDDI_OSn+1),
  activatable(IDesignModeFactory2, PHONE_NAME, Platform.Phone)]
runtimeclass DesignMode
{
    [default]              interface IDesignMode;
    [version(NTDDI_OSn+1)]
    [version(PHONE_NAME, Platform.Phone)] interface
    IDesignMode2;
}
```

In one embodiment, to eliminate potential client code breaking changes, a parser should explicitly disallow a version to be associated with the default interface for a runtime class, as there may be no scenario where a runtime class cannot specify a default interface. Once the default interface has been specified, it may be immutable under all conditions. This tends to preserve binary compatibility of a runtime class across platforms. Optionally, an implementation may allow the default interface to be different on different platforms but remain the same across all versions on that platform.

In one embodiment, to preserve binary compatibility, a parser should ensure that all platforms (and their associated number numbers) specified on the default interface exactly match all platforms (and their associated version numbers) specified on the runtime class itself. It may be desirable to not list fewer or more platforms on the default interface that are declared present on the runtime class.

A parser may perform the following validation checks for all interfaces (instance, static, activatable, composable) referenced by a runtime class.

In order for a runtime class to reference an interface on a platform, the interface reference itself may be declared to have been introduced in the same or later platform version as the runtime class.

For example, the following may be an error because an interface is declared to have been introduced to the runtime class on a platform prior to the introduction of the runtime class itself to the platform.

```
[version(PHONE_NAME, Platform.Phone)]
runtimeclass DesignMode
{
    [default]              interface IDesignMode;
    [version(PHONE_NAME - 1, Platform.Phone)] interface
    IDesignMode2;
}
```

In order for a runtime class to reference an interface on a platform, the interface declaration itself may be declared to have been introduced in the same or earlier platform version as the reference in the runtime class.

For example, the following may be an error because the interface is declared to have been introduced to the platform after the introduction of the reference to the interface within the runtime class.

```
[version (PHONE_NAME + 2, Platform.Phone)]
interface IDesignMode2 :{ ... }
[version(PHONE_NAME, Platform.Phone)]
runtimeclass DesignMode
{
    [default]              interface IDesignMode;
    [version(PHONE_NAME + 1, Platform.Phone)] interface
    IDesignMode2;
}
```

Additionally, these two declarations may be construed as equivalent:

```
[version(NTDDI_OSn),
  static(IDesignModeStatics, NTDDI_OSn),
  activatable(NTDDI_OSn)]
[version(NTDDI_OSn, Platform.Windows),
  static(IDesignModeStatics, NTDDI_OSn, Platform.Windows),
  activatable(NTDDI_OSn, Platform.Windows)]
```

That is, an explicit specification of the Windows Platform may be equivalent to omitting a Platform specification in all attributes that accept a Platform argument.

Composable Class Versioning

A composable runtime class may be used as a base class. Therefore, a version change to a composable class may effectively change all derived classes as well. Therefore, in addition to all of the prior requirements for a runtime class (which apply to composable classes), there may be additional versioning ramifications for composable classes.

```
namespace Windows.Something
{
    //forward declarations
    runtimeclass Foo;
    runtimeclass Bar;
    interface IFoo
    {
        HRESULT FooMethod( );
    }
    interface IFooStatic
    {
        HRESULT FirstStaticMethod( );
        HRESULT SecondStaticMethod( );
    }
    [exclusiveto(Foo)]
```

```
            interface IFooProtected
            {
                HRESULT FirstProtectedMethod( );
            }
            [exclusiveto(RCFoo)]
            interface IFooOverridable
            {
                HRESULT FirstOverridableMethod( );
            }
            [static(IFooStatic, NTDDI_OSn)]
            [composable(..., public, NTDDI_OSn)]
            runtimeclass Foo : Base
            {
                [default] interface IFoo;
                [protected] interface IFooProtected;
                [overridable] interface IFooOverridable;
            }
            [exclusiveto(Base)]
            interface IBaseProtected
            {
                HRESULT BaseProtectedMethod( );
            }
            [composable(..., protected, NTDDI_OSn)]
            runtimeclass Base
            {
                [default] interface IBase;
                [overridable] interface IBaseProtected;
            }
        }
```

In one embodiment, there may be two aspects to composable class versioning per product:
(1) the [composable] attribute should additionally accept an optional Platform argument similar to the static and activatable attributes; and
(2) the check that a base class should have been introduced in a version equal to or less than the deriving class' version should be extended to address platforms. A Platform X base class should have been introduced in a version equal to or less than the version in which the deriving class was introduced on Platform X.

It should be appreciated that the prior discussions demonstrate how to manage platform versioning for the introduction of an API to various platforms. It will now be described how to affect the deprecation and eventual removal of an API to various platforms. For that, it is possible to use a similar approach of tagging API constructs with the deprecate attribute.

Deprecation Attribute (deprecated)

A possible declaration of the deprecated attribute may be given as:
(1) Parameter 1: Message: String—Message to developer to suggest alternative APIs to use instead of this deprecated and/or removed API.
(2) Parameter 2: DeprecationType: Enum—Value indicating whether the construct has been deprecated or removed (hard vs. soft deprecation).
DeprecationType.Deprecate
DeprecationType.Remove
(3) Parameter 3: Version: UInt32—The version in which the deprecation or removal/hard deprecation (as applicable) was introduced.
(4) Parameter 4: Platform: Enum—The platform (Windows or other) in which the deprecation or removal/hard deprecation (as applicable) was introduced.

It should be noted that the Version and Platform values may have substantially the same semantics as discussion previously in the version attribute. Similarly, the platform may be optional. When it is omitted, the parser may select a default platform. It is also optional to select the platform with enum value zero as the default.

EXAMPLE

The following examples of deprecating are offered merely for expository purposes:

```
    [deprecated("This class will be removed in Windows version 10.
Please use runtime class OS.Foundation.Brent2 instead.",
OS.Foundation.Metadata.DeprecationType.Deprecate, NTTDI_OSn+1,
Platform.Windows)]
        runtimeclass OS.Foundation.Brent {
        ...
        }
    [deprecated("This class will be removed in OSn+2. Please use
runtime class OS.Foundation.Brent2 instead.",
OS.Foundation.Metadata.DeprecationType.Deprecate, NTTDI_OSn+1)]
        runtimeclass OS.Foundation.Brent {
        ...
        }
    [deprecated("This class was removed in OSn+2. Use runtime class
OS.Foundation.Brent2 instead.",
            OS.Foundation.Metadata.DeprecationType.Remove,
NTTDI_OSn+1)]
        runtimeclass OS.Foundation.Brent {
        ...
        }
```

Processing Embodiment

In many of the various embodiments disclosed herein, the present system allows API authors to annotate all APIs with the appropriate Version and deprecated attributes indicating when each API was introduced, deprecated, and removed on each platform. Additionally, by storing this information in metadata files that are machine readable, such present systems may affect software development tooling to provide assistance to programmers writing applications. In such a case, a programmer may indicate to the tooling what platforms and versions the programmer wishes the code to target. The tooling may use the metadata to assist the programmer in a number of ways. Some examples include:
(1) warning and/or preventing the programmer from calling APIs that do not exist in the target environment;
(2) assisting the programmer to write a single library package that will successfully operating in all the target environments by preventing the inadvertent inclusion of calls to APIs not available in all target environments;
(3) assisting the programmer by insuring that any APIs actually called which are statistically known to be not present in the specified targeted environment are encapsulated by runtime code that checks to see if the API is actually present before calling the API; and
(4) documentation for APIs can more easily be machine generated to indicate what APIs exist on which versions of each platform.

Figure 5:
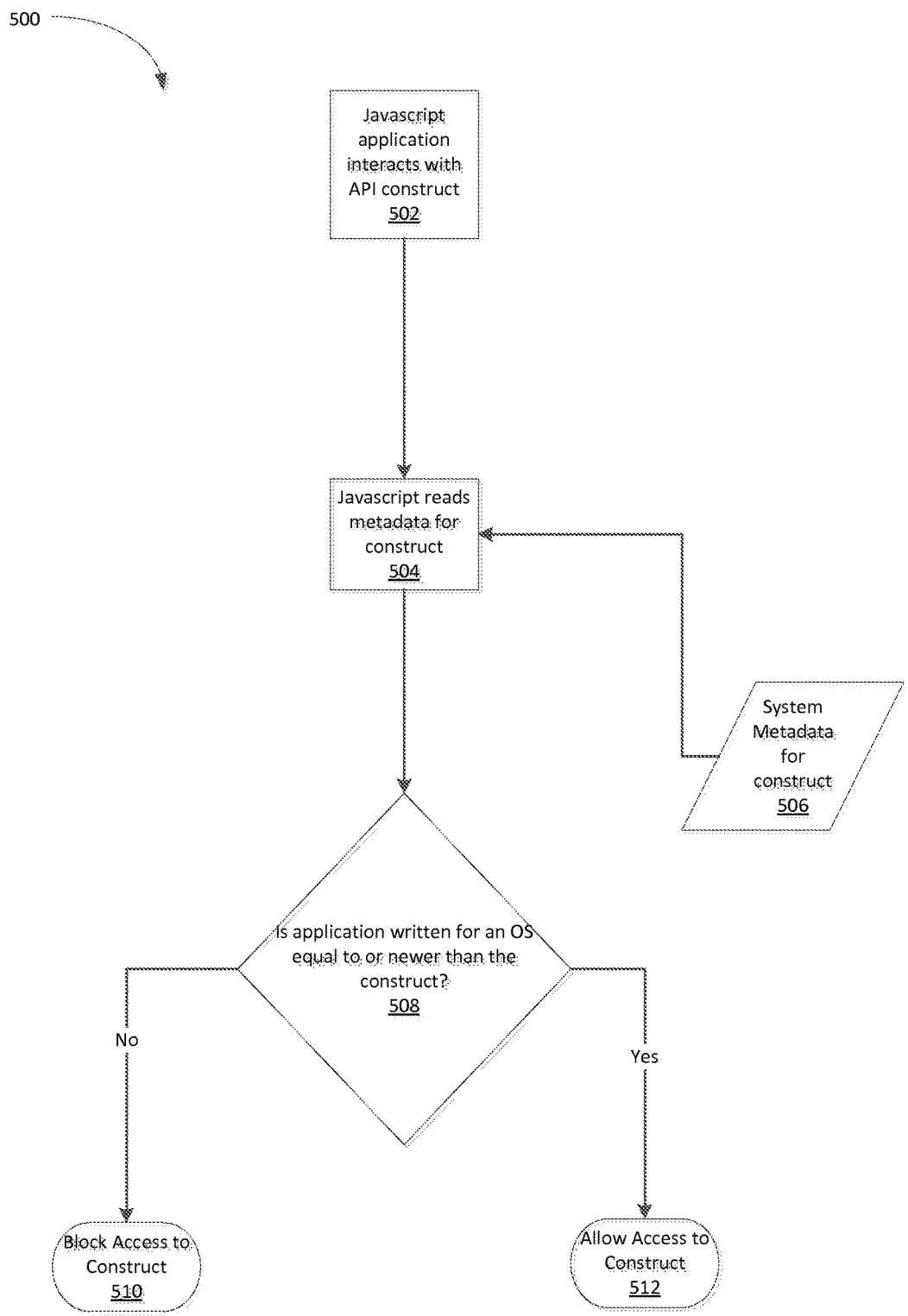
FIG. 5 is one embodiment of a runtime process that may be suitable for purposes of the present system.

FIG. 5 depicts one embodiment of a runtime process 500 that may be suitable for the present system to help enforce versioning and/or other rules. In one embodiment, Javascript is depicted as the engine driving the runtime of the system. It may be appreciated that any suitable interpreter may be used without loss of generality. At 502, Javascript application may interact with an API construct. At 504, Javascript may read the metadata for the particular construct—as may be stored in the system as suitable at 506. At 508, the runtime system may inquire whether the application at issue has been written for an OS that is equal to or newer (in time) than the construct being considered. If not, then the system blocks access to the construct at 510. Otherwise, the system allows access to the construct at 512.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

The invention claimed is:

1. A method for performing version control for Application Programming Interfaces (APIs) of an operating system, said operating system configured to be revised by version and by platform, said method comprising:

for a given API, creating metadata associated with a plurality of constructs of said API, said metadata comprising version indication data, wherein said metadata comprises a version attribute, said version attribute further comprising a version introduction value, said version introduction value indicating each one of the plurality of constructs of said API being introduced to a version of the operating system, and wherein said version indication data comprises a version value and a platform value, said version value denoting the version of the operating system in which the associated construct was revised, said platform value denoting the operating system platform associated with the version value, and wherein said metadata is created automatically from API description files;

associating the version indication data for said each one of the plurality of constructs of said API, said version indication indicating when said respective one of the plurality of constructs of said API is to be revised into a given version of an operating system;

defining versioning rules for said each one of the plurality of constructs of said API according to said metadata, wherein said each one of the plurality of constructs comprises at least one of a structure, an enum, an interface, and a composable class and wherein the versioning rules are dependent upon a given construct's version indication data; and based on construction of a new version of said operating system and said metadata associated with the plurality of constructs of said API, enforcing said versioning rules for each of the respective ones of said plurality of constructs of said API.

2. The method of claim 1, wherein said metadata comprises a deprecatable version attribute, said deprecatable version attribute further comprising a version deprecation value, said version deprecation value associating said construct being removed in a version of an operating system.

3. The method of claim 1, wherein sad set of versioning rules comprises a set of ruses that enforce permitted changes to a construct.

4. The method of claim 3, wherein one versioning rule comprises a rule not to change a given construct, if said change breaks any existing compiled code of said operating system.

5. The method of claim 4, wherein said structure may not be changed after said structure is published.

6. An integrated development environment (IDE) system, said IDE system comprising a hardware processor to execute a set of computer readable instructions to cause the hardware processor to perform a method for enforcing a plurality of constructs for an Application Programming Interface (API), said API constructed for a given version of an operating system and for a given platform, said IDE system comprising:

a build tool configured to create metadata associated with the plurality of constructs of said API, said metadata comprising version indication data, wherein said metadata comprises a version attribute, said version attribute further comprising a version introduction value, said version introduction value indicating each one of the plurality of constructs of said API being introduced to a version of the operating system, and wherein said version indication data comprises a version value and a platform value, said version value denoting the version of the operating system in which the associated construct was revised, said platform value denoting the operating system platform associated with the version value, and wherein said metadata is created automatically from API description files;

said build tool configured to receive metadata associated with the plurality of constructs for the API, said metadata comprising said version indication data;

said build tool configured to define versioning rules for said each one of the plurality of constructs of said API according to said metadata, wherein said each of said plurality of constructs of said API comprises at least one of a structure, an enum, an interface, and a composable class and wherein the versioning rules are dependent upon a given construct's version indication data;

said build tool configured to receive a plurality of versioning rules for respective ones of said plurality of constructs of said API;

said build tool configured to associate said version indication data for said each one of the plurality of constructs of said API, said version indication indicating when the respective one of the plurality of constructs of said API is to be revised into a given version of an operating system, wherein said build tool is further configured to enforce said versioning rules for said respective ones of said plurality of constructs of said API, according to said metadata associated with the plurality of constructs and construction of a new version of said operating system.

7. The IDE system of claim 6, wherein said metadata comprises a deprecatable attribute, said deprecatable attribute comprises a platform value, said platform value associating a version of an operating system with a riven platform.

8. The IDE system of claim 6, wherein sad set of versioning rules comprises a set of rules that enforce permitted changes to a construct.

9. The IDE system of claim 6, wherein one versioning rule comprises a rule not to change a given construct, if said change breaks any existing compiled code of said operating system.

10. A build tool, said build tool comprising: a hardware processor to execute a set of computer readable instructions to cause said hardware processor to perform a method for performing version control for Application Programming interfaces (APIs) of an operating system, said operating system configured to be revised by version and by platform, said method comprising:

for a given API, creating metadata associated with a plurality of constructs of said API, said metadata comprising version indication data, wherein said metadata comprises a version attribute, said version attribute further comprising a version introduction value, said version introduction value indicating each one of the plurality of constructs of said AP being introduced to a version of the operating system, and wherein said version indication data comprises a version value and a platform value, said version value denoting the version of the operating system in which the associated construct was revised, said platform value denoting the operating system platform associated with the version value, and wherein said metadata is created automatically from API description files;

associating said version indication data for said each one of the plurality of constructs of said API, said version indication data indicating when said respective one of the plurality of constructs of said API is to be introduced into a given version of an operating system;

defining a set of versioning rules for said each one of the plurality of constructs of said API according to said metadata, wherein said each one of the plurality of constructs comprises at least one of a structure, an enum, an interface, and a composable class and wherein the versioning rules are dependent upon a given construct's version indication data;

based on construction of a new version of said operating system and said metadata associated with said plurality of constructs of said API, enforcing said versioning rules for each of the respective ones of said plurality of constructs of said API.

11. The build tool of claim 10, wherein said metadata comprises a deprecatable version attribute, said deprecatable version attribute further comprising a version deprecation value, said version deprecation value associating said construct being removed in a version of an operating system.

12. The build tool of claim 11, wherein said set of versioning rules comprises a set of rules that enforce permitted changes to a construct.

13. The build tool of claim 11, wherein said structure may not be changed after said structure is published.

14. The build tool of claim 11, wherein one versioning rule comprises a rule not to change a given construct, if said change breaks any existing compiled code of said operating system.

* * * * *